United States Patent
Alloin et al.

(10) Patent No.: US 9,564,946 B2
(45) Date of Patent: *Feb. 7, 2017

(54) METHODS AND APPARATUSES FOR CHARACTERIZING COMMON MODE NOISE AND ESTIMATING LOOP IMBALANCE

(71) Applicant: IKANOS Communications, Inc., Fremont, CA (US)

(72) Inventors: Laurent Francis Alloin, Monmouth Beach, NJ (US); James T. Schley May, Nevada City, CA (US); Arnold Muralt, Fair Haven, NJ (US); Vinay Kumar Chapala, Bangalore (IN)

(73) Assignee: Ikanos Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,174

(22) Filed: Jun. 14, 2016

(65) Prior Publication Data

US 2016/0294443 A1    Oct. 6, 2016

Related U.S. Application Data

(63) Continuation of application No. 14/629,115, filed on Feb. 23, 2015, now Pat. No. 9,385,781.

(60) Provisional application No. 61/943,234, filed on Feb. 21, 2014.

(51) Int. Cl.
| | |
|---|---|
| *H04B 3/46* | (2015.01) |
| *H04B 3/487* | (2015.01) |
| *H04B 3/32* | (2006.01) |
| *H04L 25/08* | (2006.01) |

(52) U.S. Cl.
CPC ............. *H04B 3/487* (2015.01); *H04B 3/32* (2013.01); *H04L 25/085* (2013.01)

(58) Field of Classification Search
CPC ............. H01L 23/5227; H04L 25/0276; H04L 25/0278; H04L 25/0272; H04L 25/0274; H04L 25/085; H04L 5/20; H04L 25/03878; H04B 3/32; H04B 15/00; H04B 3/487; H04M 3/2209; H04M 3/18; H01F 2017/0093; H01F 27/34; G01R 29/26; G01R 31/024; H02M 2001/123
(Continued)

(56) References Cited

U.S. PATENT DOCUMENTS

| | | |
|---|---|---|
| 6,052,420 A | 4/2000 | Yeap et al. |
| 6,959,056 B2 | 10/2005 | Yeap et al. |
| 8,687,770 B2 | 4/2014 | Alloin et al. |

(Continued)

FOREIGN PATENT DOCUMENTS

JP    2009520444 A    5/2009

OTHER PUBLICATIONS

ISA/KR, International Search Report and Written Opinion of the International Searching Authority, Int'l Appl. No. PCT/US2015/016694, Jun. 4, 2015, Korean Intellectual Property Office, Daejeon Metropolitan City, KR, 8 pgs.

(Continued)

*Primary Examiner* — Tesfaldet Bocure
(74) *Attorney, Agent, or Firm* — Holland & Hart LLP

(57) ABSTRACT

The present invention relates generally to addressing performance issues in xDSL communication systems, and more particularly to methods and apparatuses to measure and characterize CM noise impacting a DSL line in a customer premises, measurements and characterization of the projec- (Continued)

tion of these CM signals in Differential Mode (DM), and finally a derivation of an estimate of the loop balance.

20 Claims, 14 Drawing Sheets

(58) Field of Classification Search
USPC ... 375/222, 224; 379/1.01, 1.03, 1.04, 90.01
See application file for complete search history.

(56) References Cited

U.S. PATENT DOCUMENTS

| | | |
|---|---|---|
| 2009/0034592 A1 | 2/2009 | Mirfakhraei et al. |
| 2009/0067614 A1 | 3/2009 | Washburn et al. |
| 2010/0135482 A1 | 6/2010 | Jagannathan et al. |
| 2014/0105262 A1 | 4/2014 | Alloin et al. |
| 2014/0177694 A1 | 6/2014 | Alloin et al. |
| 2015/0214911 A1 | 7/2015 | Johnson et al. |

OTHER PUBLICATIONS

PULSE (a Technitrol Company), "Understanding Common Mode Noise," G019.A (Apr. 1999), Apr. 1999, 7 pgs., URL: www.pulseelectronics.com/download/3100/g019/pdf.

METHODS AND APPARATUSES FOR CHARACTERIZING COMMON MODE NOISE AND ESTIMATING LOOP IMBALANCE

CROSS REFERENCES

The present Application for Patent is a continuation of and claims priority to U.S. Pat. No. 9,385,781 to Alloin et al., entitled "Methods and Apparatuses for Characterizing Common Mode Noise and Estimating Loop Imbalance," issued Jul. 5, 2016, which claims priority to U.S. Provisional Patent Application No. 61/943,234 by Alloin et al., entitled "Single Port Loop Balance and CM Port Design," filed Feb. 21, 2014 assigned to the assignee hereof.

BACKGROUND

Field of the Disclosure

The present invention relates generally to xDSL communication systems, and more particularly to methods and apparatuses to characterize common mode noise and estimate loop imbalance, for example in a customer premises.

Description of Related Art

Loop balance and Common Mode (CM) noise level measurements on a twisted pair in an xDSL communication system (e.g. ADSL or VDSL) are an important tool for an operator in order to qualify the susceptibility of in-house wiring in which customer premises equipment (CPE) is located to external noise sources.

For example, as part of a noise and loop impairment identification and classification scheme, the measurement of the loop imbalance contains valuable information for a service provider as the measurement reflects the susceptibility of the loop to external interference or to the likelihood of the loop itself radiating external interference. Generally, an imbalanced twisted pair with respect to ground will radiate external interference by converting differential signals to common mode signals and vice versa. These common mode signals may become a source of disturbances to other services (e.g. PLC receivers, AM and HAM radio receivers) or contribute to the increase of self-FEXT and self-NEXT for other VDSL services sharing the same cable binder. On the other hand, an imperfect twisted pair that is imbalanced to some degree with respect to ground tends to be more susceptible to external interference. Specifically, some of the common mode signals present on a twisted pair and induced by an external source (PLC transmitters, AM, HAM transmitters) will have a greater susceptibility to being converted to differential noise signals affecting the DSL capability of the imperfect twisted pair.

Imbalanced tip and ring pairs comprising a twisted pair occur as a result of cable imperfection during manufacturing (such as wire and twist variations), or more significantly during placement/installation, during which bends and impartial twisting may be introduced at both ends of the cable. Furthermore, the existence of non-twisted pairs in the drop which do not present proper imbalance with respect to earth (as opposed to a cable sheath in which twisted pairs are generally enclosed) may actually enhance an imbalance measurement. Finally, split-pair configurations in which wires of different twisted pairs are inadvertently paired to carry a DSL signal will produce an abnormally high level of imbalance. A short of either the tip or ring to ground (which may occur inadvertently) also results in an imbalance measurement.

One existing method to estimate the loop imbalance in a DSL system is described in U.S. Pat. No. 8,687,770 entitled "Systems and Methods for Performing Line Imbalance Measurement and Mitigation Based on a Common Mode Sensor." In this method, a near-end or far-end differential mode (DM) DSL signal is transmitted and the received common mode (CM) signal measured on a CM port is correlated with it. The loss measured is representative of the imbalance of the loop, and therefore the susceptibility of this loop to convert CM signals to DM.

While useful in some applications, there are certain drawbacks with this approach. For example, it requires the transmission of an excitation signal in order to derive a metric associated to the loop imbalance, which is not always possible or feasible. As another example, it does not address how a CM sensor can be implemented for the measurement of the loop imbalance, without contributing to a degradation of the loop imbalance itself and the level of converted common mode signal into differential mode either resulting from the deterioration of the CM rejection ratio of the front end or because of the change of CM termination impedance of the loop due to the use of a CM sensor. Finally, it does not consider how to perform the calibration of such a measurement in order to cope with imperfections of the front end balance.

Therefore, there remains a need in the art for methods and apparatuses capable of characterizing CM noise and estimating loop imbalance that address these and other challenges.

SUMMARY

The present invention relates generally to addressing performance issues in xDSL communication systems, and more particularly to methods and apparatuses to measure and characterize CM noise impacting a DSL line in a customer premises, measurements and characterization of the projection of these CM signals in Differential Mode (DM), and finally a derivation of an estimate of the loop balance. According to certain aspects, a "noise finder" session using DM signals is adapted to use CM signals instead so as to characterize noise level and characteristics of noise observed on a CM port. According to certain other aspects, a direct loop balance measurement process consists in transmitting a DM DSL signal and cross-correlating the received CM signal measure on the CM port with it. According to still other aspects, an indirect loop balance measurement process includes determining a ratio of the power of a common mode signal and of its projected differential mode signals known to be from a same CM noise source.

In accordance with these and other aspects, a method according to embodiments of the invention includes sensing a common mode (CM) signal corresponding to a noise source affecting a twisted pair; sensing a differential mode (DM) signal also corresponding to the noise source of the CM signal; deriving a ratio between the sensed CM signal and sensed DM signal, both corresponding to the noise source; and representing a loop imbalance of the twisted pair with the derived ratio.

In additional furtherance of the above and other aspects, a method according to embodiments of the invention includes coupling a known load to a twisted pair connection of a modem; measuring a common mode (CM) signal from the twisted pair connection while a differential mode (DM) signal is being transmitted on the known load; subtracting a projection of the DM signal that is converted into the CM signal to determine a compensation signal; coupling a loop under test to the twisted pair connection in place of the known load; measuring a direct CM signal from the twisted pair connection; and applying the compensation signal to the measured direct CM signal to determine an imbalance of the loop under test.

In additional furtherance of the above and other aspects, a modem according to embodiments of the invention includes a receiver coupled to transmit and receive differential mode (DM) signals on a twisted pair connection; a common mode (CM) sensor coupled to provide a CM signal as an input to a front end of a receiver under control of the receiver, wherein the CM sensor is configured to impose minimal impact on the CM rejection ratio (CMRR) of the modem and presents high CM impedance to the twisted pair connection in order to minimize CM to DM signal conversion in the front end and on a line coupled to the twisted pair connection.

In additional furtherance of the above and other aspects, a method according to embodiments of the invention includes sensing a common mode (CM) signal corresponding to a noise source affecting a twisted pair; sensing a differential mode (DM) signal also corresponding to the noise source of the CM signal; verifying that the DM signal is caused by the CM signal and the noise source; and determining an imbalance of the twisted pair using the sensed CM signal and the sensed DM signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention relate to methods and apparatuses to measure and characterize CM signals impacting a DSL line while it is not in service, measurements and characterization of the projection of these CM signals in Differential Mode (DM), and finally a derivation of an estimate of the loop balance.

Embodiments of the invention can be considered extensions of the noise sensing and analysis inventions of co-pending U.S. patent application Ser. No. 14/054,552, filed Oct. 15, 2013, published as U.S. Pat. No. 9,385,780, and Ser. No. 14/056,767, filed Oct. 17, 2013, published as U.S. Pat. No. 9,166,651, the contents of which are incorporated by reference herein in their entirety.

According to certain additional aspects, embodiments of the invention provide the ability to identify and characterize in-house wiring installations that are prone to noise susceptibility, either because of the presence of unusual CM noise levels, or because the loop is highly imbalanced, or both.

Figure 1:
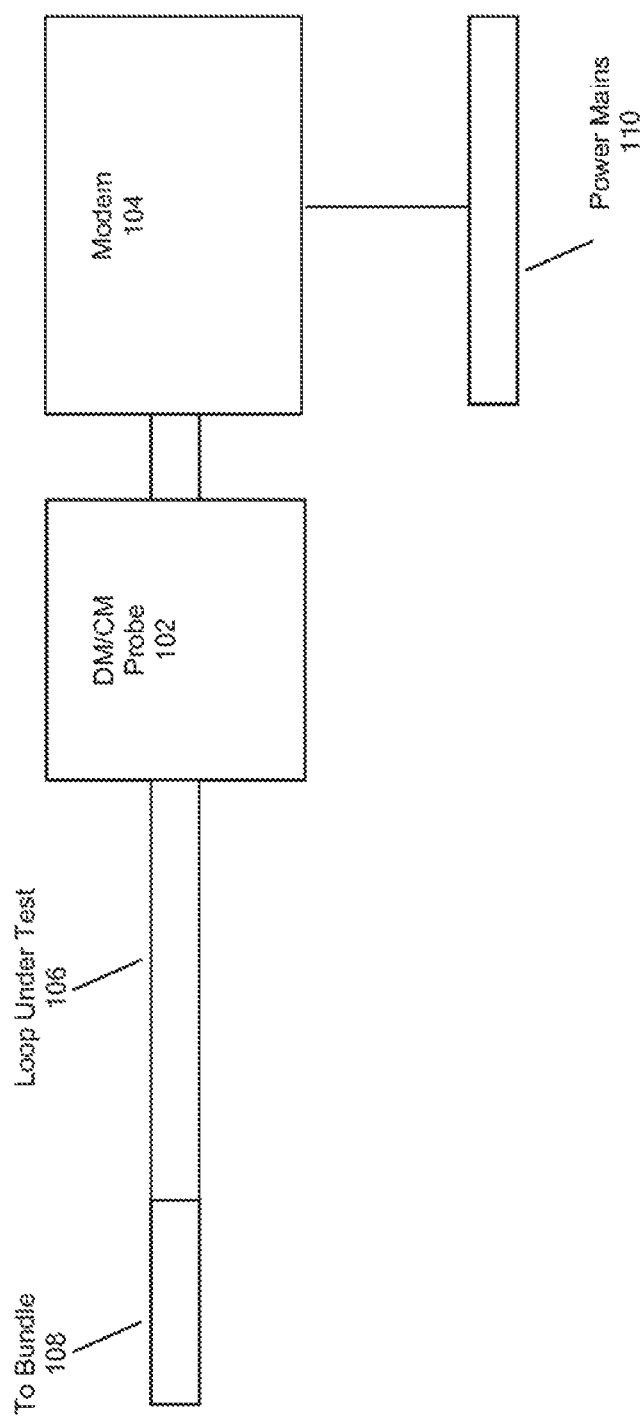
FIG. 1 is a block diagram of an example modem and probe configuration according to embodiments of the invention.

FIG. 1 is a block diagram illustrating example aspects of the present invention.

As shown, modem (i.e. CPE) 104 is coupled to a loop under test 106, which comprises a conventional twisted pair for Tip and Ring signals. Typically, loop 106 is within a home or other similar premises (e.g. in-house cabling system, drop wire or cable bundle) and connects modem 104 to an xDSL carrier (e.g. ADSL, VDSL, etc.) via additional external wiring 108 to a bundle, for example. According to certain aspects set forth above, embodiments of the invention allow for detection and characterization of unwanted CM noise signals on loop 106, as well as an estimate of the in-house loop 106 imbalance.

As further shown, embodiments of the invention further include a DM/CM probe 102. In embodiments, probe 102 is an analog device that provides either selectively or simultaneously a substantially DM-only signal and a substantially CM-only signal to modem 104. Although shown in FIG. 1 as being separate from modem 104 and coupled between it and loop 106, this is not necessary. As will be described in more detail below, embodiments of the invention include integrating probe 102 in modem 104 and/or coupling probe 102 directly to modem 104.

As will be described in more detail below, software or firmware in modem 104 uses the substantially DM-only signal and the substantially CM-only signal to detect and characterize CM noise affecting the loop 106, as well as to provide an estimate of the imbalance of loop 106. As shown in FIG. 1, noise sources in the home can include noise from in home appliances (e.g. vacuum cleaners, lamps or machines) that couple to the modem 104 via in-home power mains 110 or through capacitive coupling between mains 110 and wiring 108 or loop 106. Such noise sources can also include radio frequency interference disturbers (i.e. RFI disturbers) such as PLC transmitters, AM transmitters and HAM transmitters that couple onto wiring 108 or loop 106.

In embodiments, modem 104 includes an xDSL chipset such as a Vx185 chipset provided by Ikanos Communications, Inc. Such chipsets in modem 104 can further include embedded software or firmware for performing the functionalities of the co-pending applications as well as the present invention, such as SmartCPE and/or RobustCPE provided by Ikanos Communications, Inc., as adapted by the present invention. Those skilled in the art will be able to implement the functionalities of the present invention by adapting such chipsets and such firmware and software after being taught by the present examples.

Dual Port Platform

Figure 2:
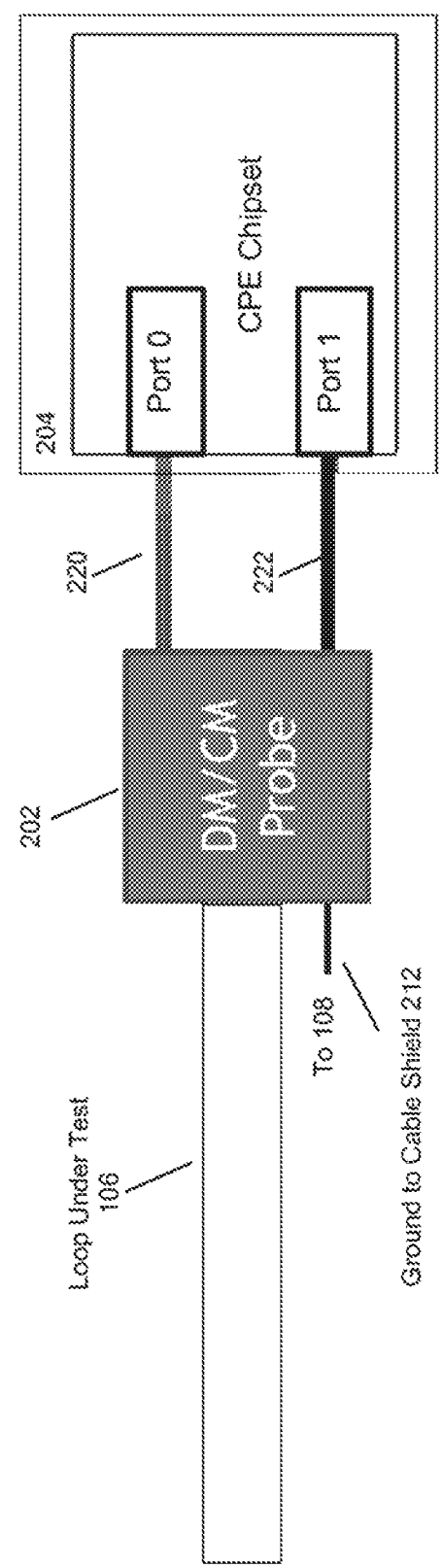
FIG. 2 is a block diagram of an example configuration using an external probe and a dual port bonded modem.

FIG. 2 is a block diagram illustrating one example configuration of a DM/CM probe and modem for implementing the CM noise characterization and loop imbalance estimate methodologies of the present invention.

In this example, DM/CM probe 202 is external to modem 204. It simultaneously senses both the substantially CM and DM signals 220, 224 on the loop and provides them to port 0 and port 1, respectively, of a CPE chipset in modem 204, such as a bonded dual port Vx185 platform. As further shown, probe 202 includes a ground connection 212 from the CM portion of probe 202 to the cable shield from bundle 108. In other embodiments, the CM portion of the probe 202 can be connected to other ground reference such as an earth wire, or possibly the modem 204 board ground.

In embodiments to be described in more detail below, this dual platform enables transmission of a DM excitation signal on one port, while sensing it on another port to perform a loop imbalance measurement. It also enables an estimate of the balance of the loop indirectly without excitation signals by performing correlation of DM and CM signals sensed on both ports. The concurrent sensing of both DM and CM signals at the same time and a measurement of the correlation of DM and CM signals yields a fairly reliable loop imbalance estimate.

It should be noted that the use of an external probe 202 typically requires a step by step measurement process performed by a qualified technician. In such processes, modem 204 can include user interface functionality (e.g. via an Ethernet port on modem 204 and an integrated browser application) for enabling the technician to perform the CM noise characterization and/or loop imbalance estimation processes of the invention.

Single Port Platform

Figure 3:
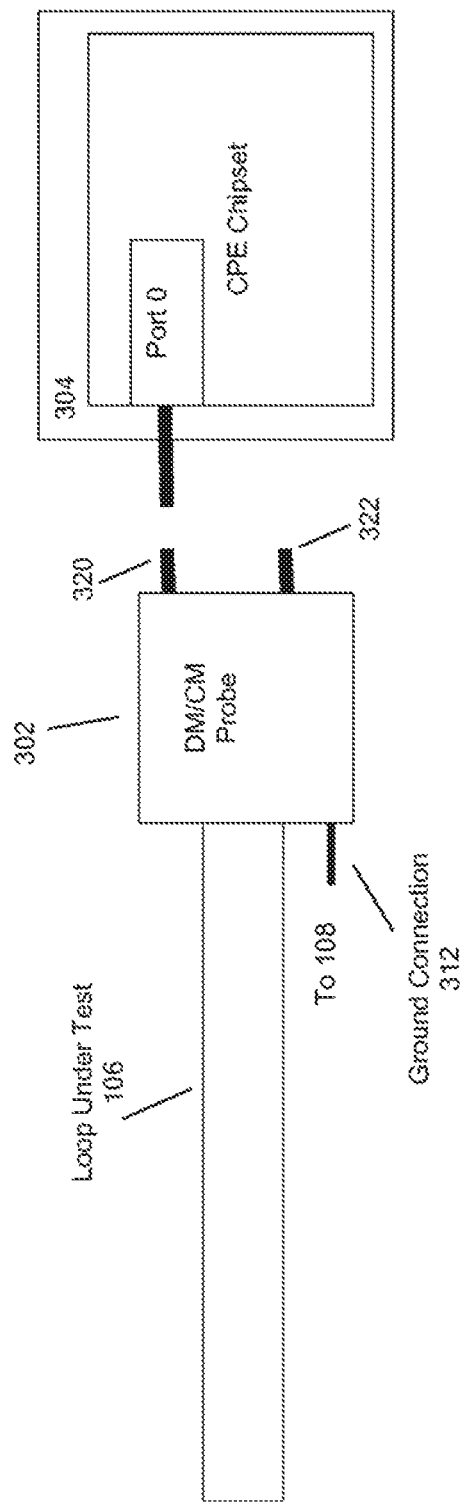
FIG. 3 is a block diagram of an example configuration using a single port modem and an external probe.

FIG. 3 is a block diagram illustrating another example configuration of a DM/CM probe and modem for implementing the CM noise characterization and loop imbalance estimate methodologies of the present invention.

In embodiments to be described in more detail below, the measurement procedures in this example configuration would consist in running first a noise characterization session while the modem 304 is connected to the DM output port 322 of the probe 302 to characterize DM noise sources. Subsequently, another noise characterization session would run while the modem 304 is connected to the CM output port 320 of the probe 302 to characterize CM noise sources. From these consecutive measurements, a post process can be performed to derive an estimate of the loop balance. Alternative sequences of CM followed by DM noise sessions are possible to guarantee reliability of the estimate of the loop imbalance.

Similar to the previous example, DM/CM probe 302 is external to modem 304. It senses both the substantially DM and CM signals on the loop 106 and selectively provides only one of them to port 0 of a CPE modem chipset (e.g. a Vx185 platform) in modem 304 (e.g. by a person selectively coupling output ports of probe 302 to the port of modem 304, or by a person selecting a DM/CM output switch on probe 302. Similar to the previous example, probe 302 also includes a ground connection 312 from the CM portion of probe 302 to the cable shield from bundle 108.

As in the previous example, the use of external probe 302 typically requires a step by step measurement process performed by a qualified technician. In such processes, modem 304 can include user interface functionality (e.g. via an Ethernet port on modem 304 and an integrated browser application) for enabling the technician to perform the CM noise characterization and/or loop imbalance estimation processes of the invention.

Single Port Platform with Internal CM Probe

Figure 4:
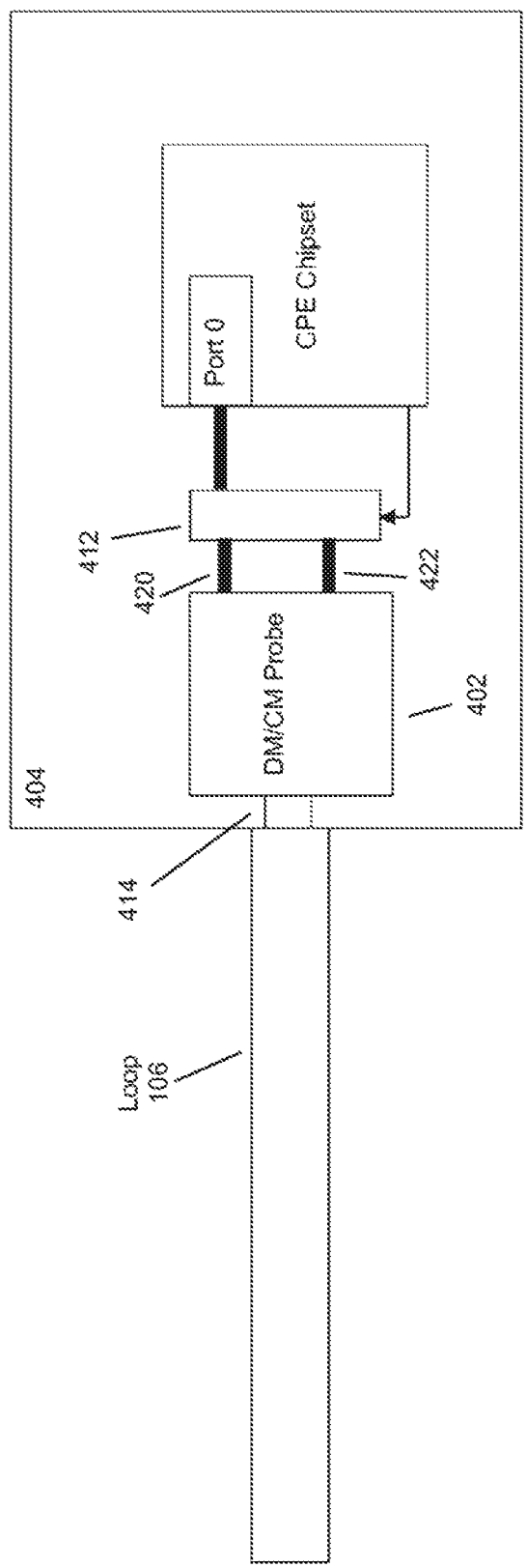
FIG. 4 is a block diagram of an example configuration using a single port modem and an internal probe.

FIG. 4 is a block diagram illustrating another example configuration of a DM/CM probe and modem for implementing the CM noise characterization and loop imbalance estimate methodologies of the present invention.

As shown in this example, probe 402 is internal to modem 404 and connects directly (i.e. has a direct twisted pair connection) to the tip/ring pair 414 of loop 102. Probe 402 provides either a substantially CM signal 420 or a substantially DM signal 422 to a single port of a CPE device including a modem chipset such as a Vx185, as controlled by the chipset and switch 412. Although switch 412 is shown separately for illustration purposes, it should be apparent that the CM signal from probe 402 can be coupled to an unused input to the LNA or the PGA of the receive path of the CPE device, where it can be muxed internally as an alternative to using the DM mode input from probe 402.

As opposed to the ground connections 206 and 306 in the external probe examples, the ground reference for the CM signal (not shown) could be implemented by a real connection to earth through a bypass wire in the power supply of modem 404, or alternatively to the modem 404 board ground and indirectly through the existing capacitance leakage of the modem 404 to earth.

In embodiments to be described in more detail below, the configuration of FIG. 4 can alternatively characterize noise sources on the DM port as well as on the CM port via a configuration of the LNA or PGA inputs. Moreover, it can perform a loop imbalance measurement with a local or far end excitation signal. According to certain aspects, a measurement process using the configuration of FIG. 4 does not require the assistance of a qualified technician. However, only a consecutive measurement of CM and DM signals is possible. As described in more detail below, in order to preserve a good common mode rejection ratio (CMRR) of the platform, and its ability to reject CM interference, the CM signal can be sensed after a CM choke and therefore suffers from a large attenuation of the desired CM signal that is measured. It also suffers from the possible part to part variation of the specific choke attenuation. Accordingly, in embodiments of the configuration of FIG. 4, a specific calibration process described in more detail below is used to increase the accuracy of the measurement process and make it more independent of the front end characteristics and its variations.

Internal Probe

Figure 5A:
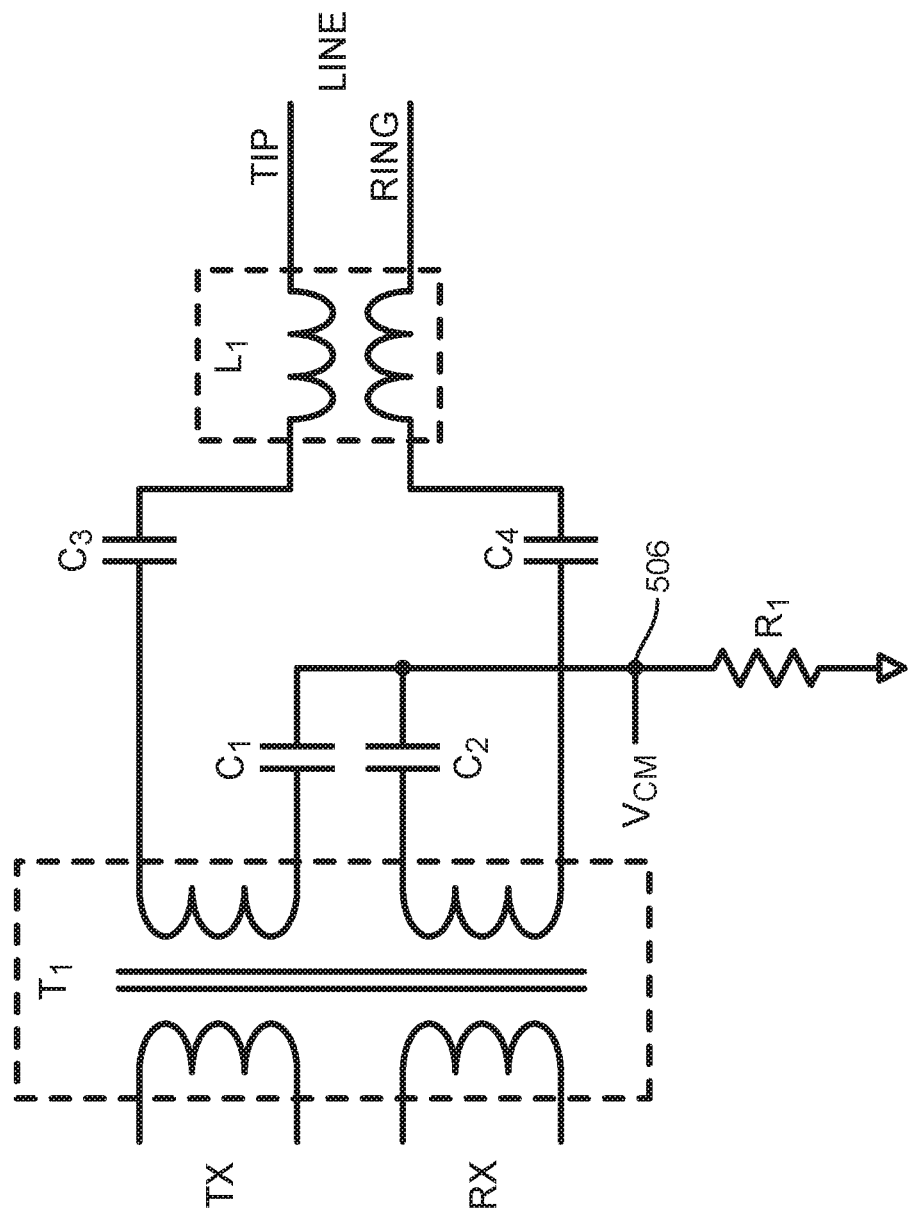
FIGS. 5A to 5C are block diagrams of example configurations using a single port modem with an internal probe.

FIG. 5A is an example implementation of a DM/CM probe 402 that can be used in the internal probe embodiment illustrated in FIG. 4.

According to certain aspects, the shown implementation enables sensing of the CM signal without disrupting the balance of the front end of the modem 404. The CM signal is sensed at the mid-point 506 of the coupling transformer T1 at the line side after the CM choke L1 (which is itself connected between T1 and the twisted pair connection or tip/ring). The CM signal Vcm can be connected to a second unused input to the LNA or the PGA of the DSL CPE chipset (e.g. Vx185), where it can be multiplexed internally as an alternative to using the DM mode signal RX.

In embodiments, by using a nominal resistance value (e.g. 100 ohms) for resistor R1, the balance of the front end is kept and measurement of the CM signal is made possible. The CM signal Vcm, being measured at the line side (after choke attenuation), represents a good replicate of the CM signal on the line except that it undergoes the attenuation of the CM choke L1. In embodiments described in more detail below, the attenuation of the CM choke L1 is calibrated out to yield a line-referred CM signal. While the presence of the CM choke L1 can be seen as detrimental for an accurate measurement, it also serves the purpose of attenuating CM signals that have by essence a high power and which may saturate the CM receiver front end. It also ensures that the CM sensing does not jeopardize the balance of the DSL front end. In this configuration, the CM sensor does not introduce imbalance to ground and should not compromise the balance of the front end.

Although FIG. 5A illustrates one specific example configuration of an internal DM/CM probe, the invention is not limited to this specific example. Among other things, increasing the resistance of resistor R1 may increase the CM voltage level at the mid-point of the transformer, thereby increasing its likelihood of conversion to DM for the DSL receiver. Alternately, lowering the effective resistance of R1 to essentially zero ohms can be achieve by connecting node Vcm to the summing node of an opamp, thereby sensing current at ground potential. This would allow minimum voltage excursion on T1, minimizing DM conversion. However, a low resistance value (e.g. =<100 Ohms) is a good compromise between those two extremes. It should be still further noted that a nominal attenuation introduced by choke LI is on the order of 30 to 4S dB to improve the CMRR characteristics of the modem. A lower attenuation may still be satisfactory to keep overall CMRR level under control, while providing less attenuation of CM signals for the purpose of CM sensing.

Figure 5B:
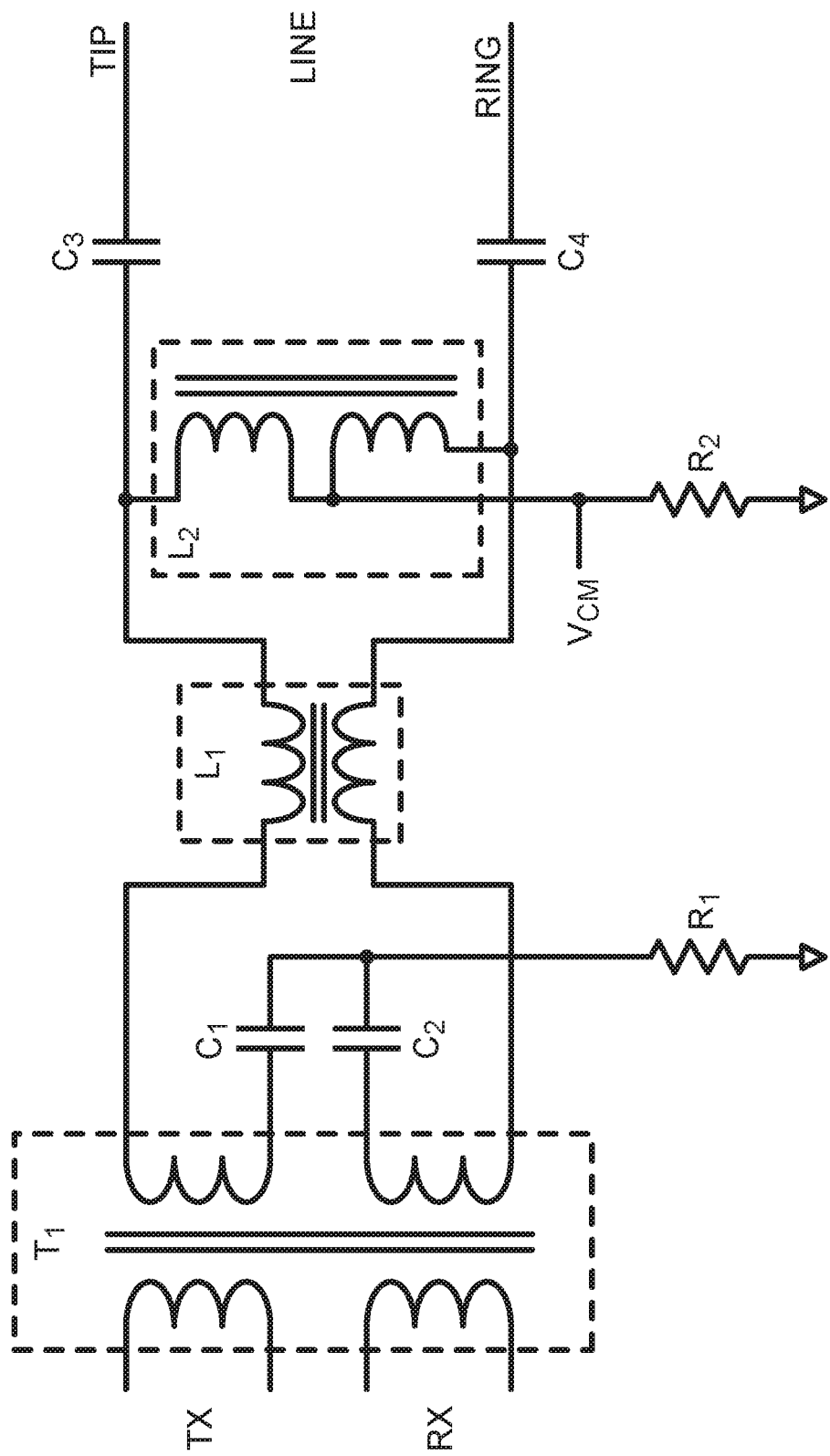

FIG. 5B illustrates another embodiment of the implementation of a DM/CM probe 402 that can be used in the internal probe embodiment illustrated in FIG. 4. Here, the common mode sensor takes the form of coupled inductor L2, with its midpoint connected to node Vcm and resistor R2. Coupled inductor L2 is designed so that its windings are as precisely equal as possible, so as to not unbalance the line being measured. DC blocking caps C3 and C4 have moved position, relative to the embodiment in FIG. 5A, to keep DC from flowing in coupled inductor L2. In this configuration, the sensor is ahead of CM choke LI, thereby allowing the sensing of common mode energy before it is attenuated by the choke. This offers a distinct advantage of a higher signal level, resulting in a higher signal-to-noise ratio of the measured CM signal. But this advantage comes at the expense of an extra precision component L2. In this configuration, RI may have values in the range of zero ohms to 100 ohms to open circuit.

Figure 5C:
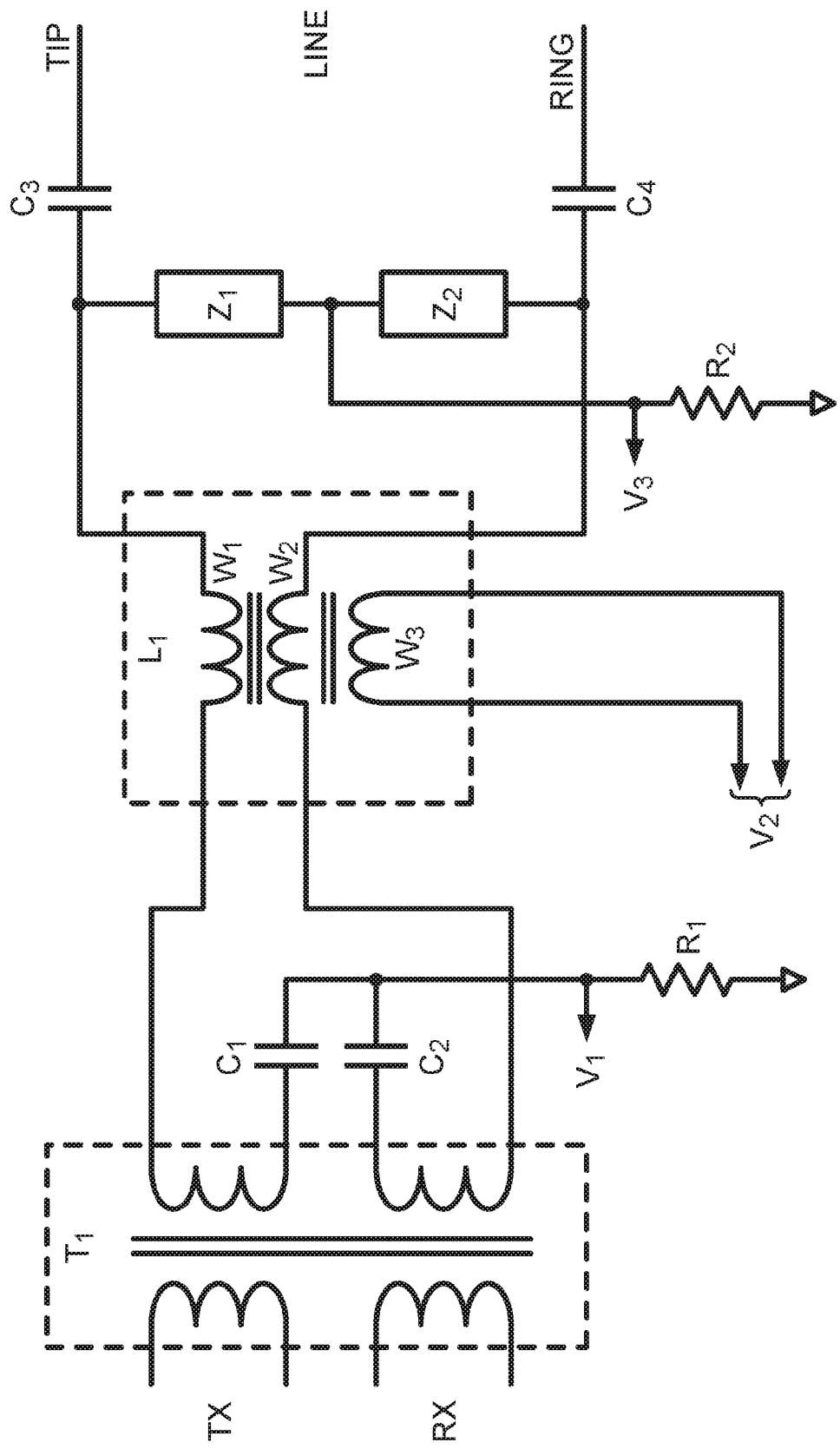

FIG. 5C illustrates a similar, but more general approach to what is shown in FIGS. 5A and 5B. It contains all of the elements of both, but adds two new ideas. First, coupled inductor L2 has been replaced by two generic impedance blocks Z1 and Z2. They could be, for example, two matched resistors of medium to high impedance, forming a precision voltage divider. They could just as easily be two matched capacitors. And of course, they could be two matched inductors, coupled, as described in 5B. It should be obvious to one skilled in the art that there are many useful configurations for Z1 and Z2 comprised of Rs, Ls, and Cs. The second new concept shown in FIG. 5C is the addition of a third coupled winding W3 to common mode choke L1. This third winding, if fitted, would mirror any common mode voltage developed across windings W1 and W2. If this winding W3 were connected to an active receive element such as an opamp input, either differentially or single ended, for example, voltage at node V2 would be representative of the common mode signal on TIP and RING.

Thus, in FIG. 5C, three basic options, with variations, are shown for sensing the common mode signal, terminating at nodes VI, V2, and V3. Depending on overall system design considerations, one may be more suited than the others.

Characterization of CM Noise

Co-pending U.S. application Ser. No. 14/054,552, published as U.S. Pat. No. 9,385,780 describes a "noise finder" method that characterizes and classifies noise sources detectable on the DM port while the modem is not in service. As such, it uses the output of the FFT, rather than slicer errors, as its input data. In one example, it uses a defined period of observation (e.g. 2 minutes) to detect, classify and track noise sources, as wideband vs. narrowband, impulsive vs. continuous, intermittent vs. permanent for the duration of the observation window. The noise sources visible are differential mode noise sources such as FEXT, NEXT, and also projection of CM noise in DM.

Embodiments of the present invention adapt the "noise finder" method of the copending application by performing a similar detection and classification on CM input signals that are obtained using a DM/CM probe such as described above. As such, the present invention is capable of detecting and classifying noise sources that exist as CM signals on the DSL loop before being converted to DM.

The present inventors recognize several advantages of running this process directly on CM signals. First of all, since noise developing on the CM sensor can be considered as possible source of ingress in DM after conversion by the loop imbalance, this CM signal is easier to characterize at its sources. For example, while the DM self-FEXT signal will dominate or equate the level of the projected CM signal on the DM port, the CM noise signal on the CM port is expected to supersede significantly the level of the projection of the DM self-FEXT signal onto the CM port. It is therefore much easier to characterize the unwanted CM noise before its conversion takes place to DM noise. Secondly, the absolute level of the CM noise signal measured at the tip and ring is indicative of the severity of the noise environment in a house and of the proximity to an actual noise source, regardless of whether or not this noise affects the DSL line after conversion to DM noise. An unusually high level of CM noise is indicative of either the proximity to a strong noise source, or an unusual high coupling mechanism between the medium on which this noise source is present (e.g. powerline) and the twisted pair. Such high coupling may result from the close proximity of a powerline transmission line and the in-house phone twisted pair over a certain distance.

The easier identification of CM noise sources and of the determination of their relative and absolute levels are two advantages of processing CM signals, as a substitute to DM signals.

To adapt the "noise finder" method of the co-pending application to use CM signals instead of DM signals, various parameters are changed to match expected noise floor levels in CM that may typically be higher than corresponding DM noise floors. CM noise characterization must further account for the fact that CM signal levels may be different than DM signal levels due to the absence of FEXT, NEXT in CM. Such specific parameters of the noise finder module that may need to be adjusted to enable operating on CM signals may include absolute reference level and sensitivity threshold for noise level detection and bands or frequencies, where noise sensing should be performed or avoided.

Direct Loop Imbalance Measurement

In addition to methods for characterizing CM noise as described above, embodiments of the invention include methods for performing both direct and indirect estimates of loop balance using CM signals.

Figure 6:
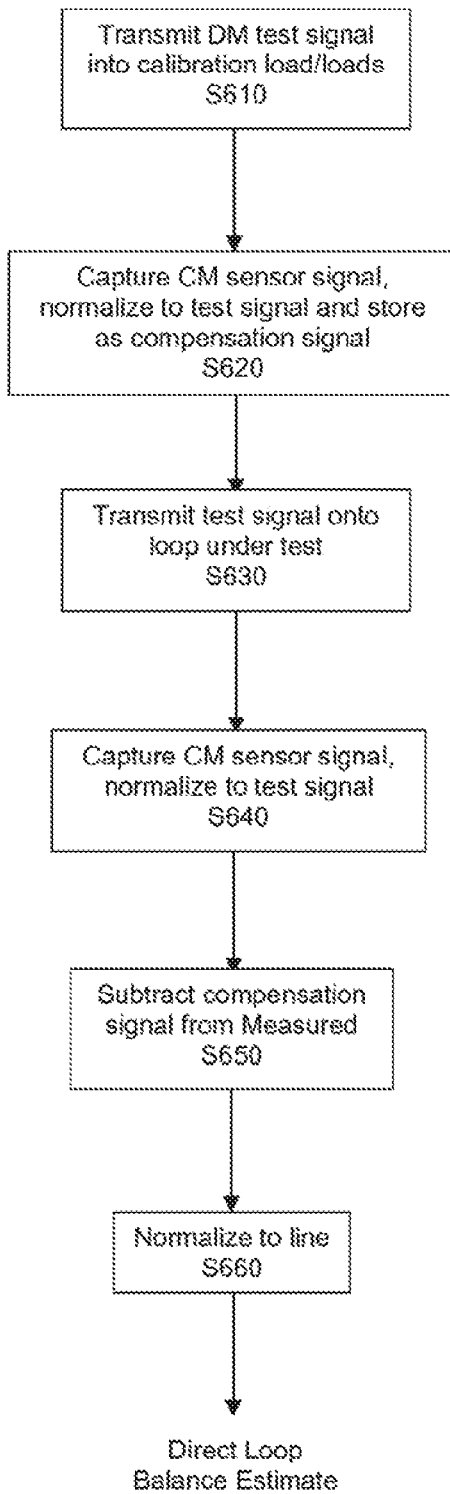
FIG. 6 is a flowchart illustrating an example method of performing a direct loop balance estimate according to embodiments of the invention.

FIG. 6 is a flowchart illustrating an example method of performing direct estimates of loop balance according to embodiments of the invention.

As shown in FIG. 6, embodiments of the invention include a calibration process in step S610 (e.g. performed offline). Such a calibration process can eliminate or mathematically compensate for the conversion of DM signals emanating from the transmitter itself (e.g. from the DSL CPE chipset), as well as residual imbalances in the CM sensor circuitry, as well as other artifacts, thereby providing a more faithful representation of the CM signal generated by the loop imbalance itself.

In one example, during step S610, a calibration load of 100 ohm differential, floating with no common mode connections so that the common impedance is as high as possible, is connected to the system while transmitting a test signal. Then in S620, the common mode sensor's signal is captured and normalized to (divided by) the test signal. The result is stored as a compensation signal to be used in step S650. Steps S630 and S640 obtain the measured CM conversion of the test loop, but contain errors caused by the residual imbalance of the measurement sensor and system. The present invention circumvents this problem in step S6SO, where the calibration signal, representing the error, is subtracted from the measurement to obtain a much more accurate measurement of the loop imbalance. It should be noted that this subtraction must be done with the complex valued signals, rather than with just the magnitudes of the signals.

It should be noted that the steps shown in FIG. 6 apply equally to the internal sensor embodiments shown in FIGS. 5A, 5B, and 5C. Whether the CM sensor is preceded by the attenuating choke, as in FIG. 5A, or not as is FIG. 5B, does not change the way the calibration function works. In the case of FIG. 5A, the measured levels are all lower, but they divide out, yielding the same compensation signal in both cases. Finite noise floor levels may favor the embodiment shown of FIG. 5B. It should be noted that the calibration process S610 can be performed with more than one calibration load in order to improve the accuracy of the compensation signal.

In any of the preceding examples, the measured reference signal is stored in step S620. It should be apparent that the calibration process can be performed only once and the resulting reference signal stored in permanent memory of the modem or stored in an external database along with a unique ID for later access, or the process can be performed on-site by an actual technician or a customer provided that the person substitute the loop with the calibration load and not at the same time as any of the following steps; alternatively the calibration load can be part of the front end design and be substituted to the loop via a multiplexer controlled by the DSL CPE. While the calibration process is typically done on a per port basis, some or all of the measurement calibration may be done for a representative platform of a particular design and apply to all ports or platforms of a particular design.

Next, in step S630, a test signal is transmitted. For example, with reference to the example probe shown in FIG. 5A, a DM signal is transmitted by the DSL CPE chipset, which is provided to transformer T1 toward the RJ11 jack. This can be a local known excitation signal, such as a wideband signal of digital or analog origin. Alternatively, this can be SELT-UER signal in which a multicarrier signal is produced at the baud rate and with PSD characteristics of the DSL line code to satisfy a mask and spectrum compatibility.

In any event, in step S640 the resulting CM signal is simultaneously measured and correlated. For example, with reference to the example probe shown in FIG. 5A, the DM transmitted signal is provided to the local loop via the RJ11 jack and reflected back after conversion to CM on the loop imbalance through the CM choke L1, which attenuates it. The attenuated converted CM signal on the loop is then measured at Vcm.

Next in step S650, the reference signal from step S620 is subtracted from the measured CM signal from step S640, resulting in the direct loop balance estimate according to example embodiments of the invention. In embodiments, the calibration process is carried out on a per tone basis and the result is provided as a value per band or a per tone projection of the loop imbalance. Finally, in step S660, a normalization is applied to the result of step S650 in order to compensate for the attenuation of the measured CM signal from the Tip and Ring to the output of the CM sensor.

Figure 7:
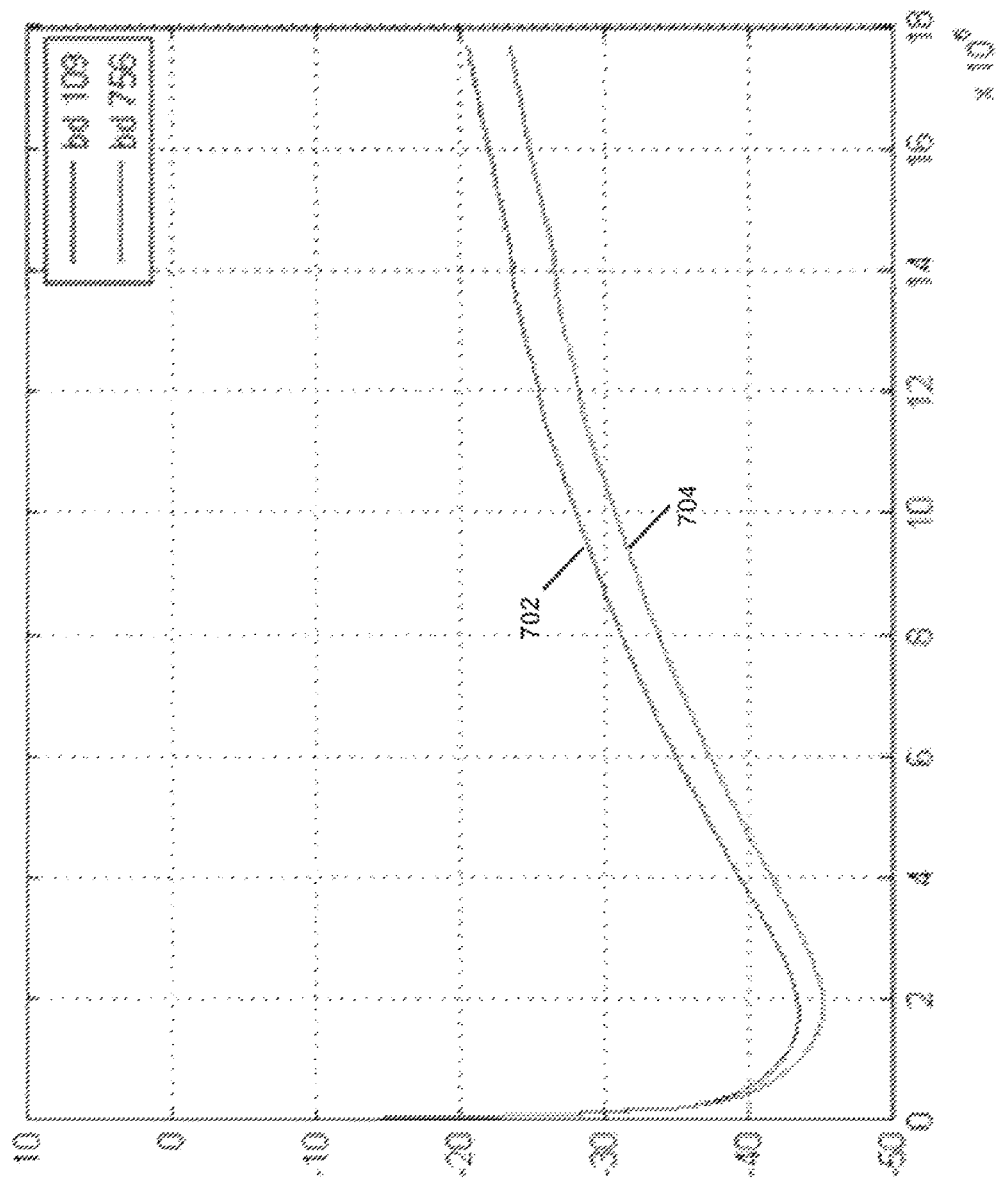
FIG. 7 is a chart illustrating example reference signals for CM choke attenuation of two different chokes.

FIG. 7 is a graph illustrating two example normalization transfer functions 702, 704 for two different CM chokes for the purpose of reporting a normalized imbalance (i.e. referred to the line) for the example embodiment of FIG. 5A.

Figure 8:
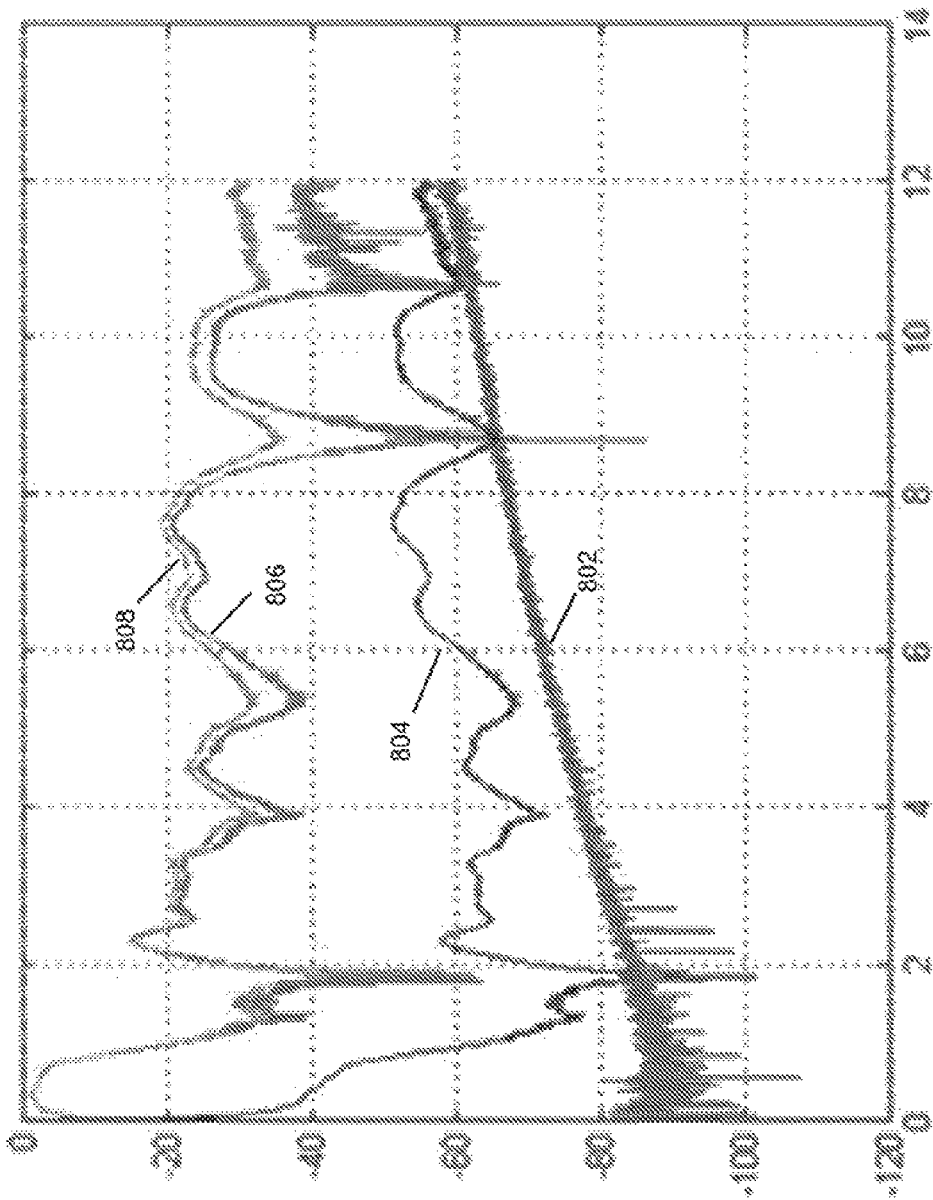
FIG. 8 is a chart illustrating an example direct balance measurement from 0 to 17 MHz (y axis is dBm/Hz)

FIG. 8 is a graph illustrating example results obtained using the principles of the invention, in which the known reference imbalance 802 is subtracted from the raw imbalance measurement of the loop under test 804, before being compensated by the choke CM attenuation in order to yield a more accurate calibrated loop imbalance measurement 806. FIG. 8 further provides a comparison to the calibrated loop imbalance measurement 808 without reference signal subtraction.

Other calibration methods can be derived and may employ a plurality of load networks each having a known common mode and differential mode impedance and precisely defined imbalance. The impedances can include values such a 0 ohms (short), infinite ohms (open), and a predetermined, finite value (load). At least one of the networks should have a precise, predetermined imbalance. The networks can have L, or PI or star configuration each consisting of two or three impedances, respectively.

It should be noted that in direct loop imbalance measurements, for example using a DM/CM probe such as that illustrated in FIG. 5A, results can be improved by ensuring a balance of the transformer S02. This can be done by, for example, screening the transformers in such a way that that response is below a certain level. Alternatively, in order to limit the impact of the transformer balance on the measurement, the CM sensor can be placed in front of the CM choke, as illustrated in FIG. 5B, thereby limiting the attenuation of the CM choke attenuation on the desired CM signal converted from the loop imbalance, and introducing attenuation to the CM signal produced by the transformer imbalance before it superimposes itself onto the desired CM signal converted from the loop imbalance to be measured.

Indirect Loop Imbalance Measurement

Example embodiments of the invention further include methods for performing indirect loop balance estimates.

In some embodiments, such indirect estimates are obtained using results of the "noise finder" method described in co-pending U.S. application Ser. No. 14/054,552, both using DM signals as described in that application, as well as CM signals as described in more detail above. In this example, the present inventors have recognized that whenever a CM signal sensed on the CM sensor is believed to be of sufficient level to impact the DM signal level perceived on the DM sensor, a fairly accurate estimate of the loop imbalance can be derived from the ratio of line referred PSD levels obtained on both sensors. This scenario is called an indirect loop balance estimate because it does not result from an excitation signal provided by the transmitter as described in the examples above. Instead, it relies on the presumption that a CM noise exists that also perturbs the DM sensor, and that this DM projection of the ingress CM signal can be differentiated from other DM noise sources, such as FEXT or background noise that do not originate from CM. Such scenarios include REIN impulse noise scenarios where impulses are realistically assumed/known to be of CM origin, and an aperiodic WB noise level that suddenly increases in CM against a CM background noise. A practical such noise scenario includes a wideband HP AV signal that originates from powerline and makes its way to CM on the twisted pair, before being converted by the balance of the loop in differential mode.

In embodiments, once a particular noise source is identified and characterized using both CM and DM signals as described in the co-pending application and as adapted in the present invention, a ratio of the impulse PSDs measured for that particular noise source in both CM and DM over a one second window or more is obtained. These can be clearly differentiated from the background noise PSD (by appropriately estimating impulse impacted symbols and non-impulse impacted symbols PSD separately) and can provide a rather accurate estimate of the balance of the loop as perceived by the modem with respect to that particular noise source and its point of injection on the loop.

Figure 9:
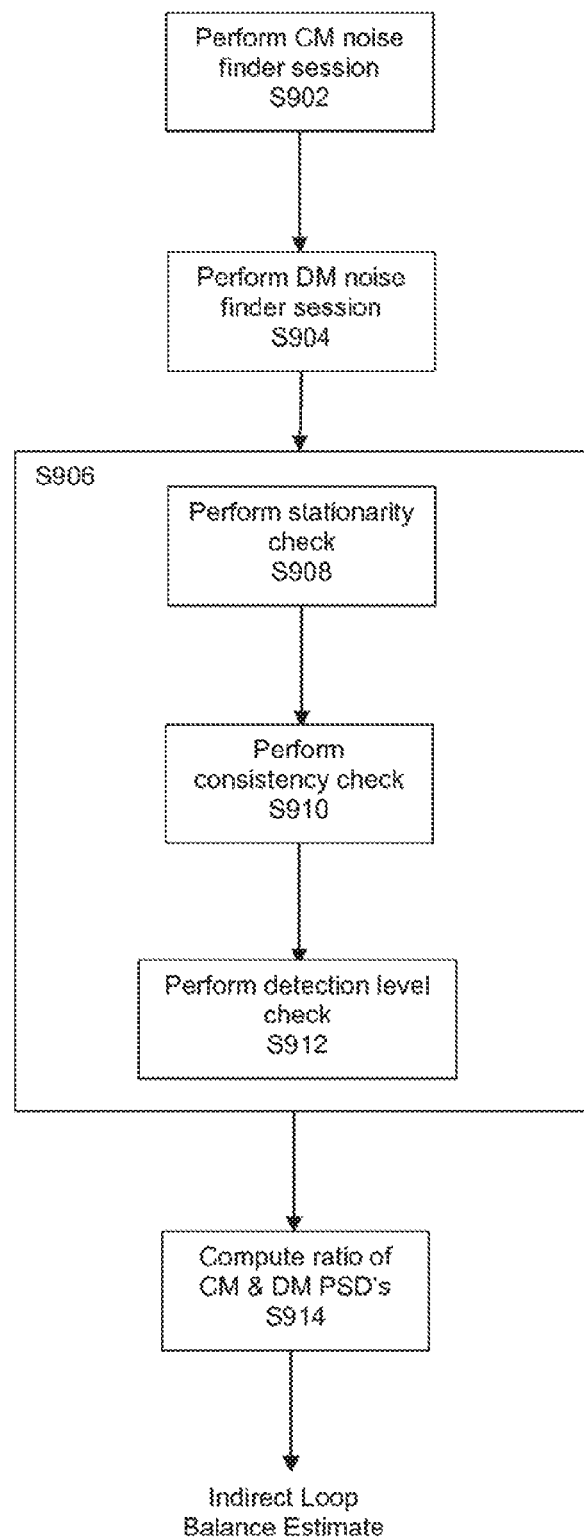
FIG. 9 is a flowchart illustrating an example method of performing an indirect loop balance estimate according to embodiments of the invention.

An example indirect loop imbalance measurement process is illustrated in the flowchart of FIG. 9.

As shown in this example, successive DM and CM noise finder sessions are performed in steps S902 and S904, respectively.

As described in the co-pending application, and as adapted for the present invention, in steps S902 and S904, the DM and CM noise is measured over a window of several seconds. It is to be noted that this duration can be reduced or extended. During each second of each DM and CM noise finder sessions, an average PSD of the impulse impacted symbols within each second is computed together with an average PSD of non impulse impacted symbols. The computation for the min, max and average of those one second PSD arrays over the duration of each noise finder session is performed, as well as an analysis of the noise environment constituents over the window of observation, such that at the end of the each CM and DM noise finder sessions in steps S902 and S904, a description of the noise sources present in each observation window is available for comparison.

Using the results from S902 and S904, a particular noise source that is present in both CM and DM is identified in step S906. As detailed below, the successful detection of noise sources of appropriate characteristics and of statistics across the two or more CM and DM noise finder sessions in steps S902 and S904, helps determine whether CM noise is present that impacts the DM mode in which frequency band, and which characteristics can be further post-processed in order to yield an indirect loop balance estimate at which frequency and with what reliability metric.

In order to ensure a correct identification, example embodiments of step S906 include the following additional processing of the successive CM and DM PSD estimates derived in each CM and DM noise finder sessions in steps S902 and S904.

1) Stationarity Check Throughout Measurement:

First, as shown in the example FIG. 9, in step S908 the stationarity of the noise source within each DM and CM window of observations and across the successive DM and CM windows of observations is determined. In other words, the signals for that noise source should have similar statistics and be present throughout both CM and DM consecutive Noise Finder sessions in a consistent manner.

In one example of performing steps S902 and S904, two different CM sensing sessions take place (i.e. CMI and CM2), with a DM sensing session in between, as CM sensing is more reliable than DM sensing due to the relatively higher level of CM signals. A consistency check between noise sources sensed during CMI and CM2 sessions gives a confidence level that the noise sources were stationary throughout the measurement and in particular, it can be inferred that the same noise sources were stationary in between the CM noise sensing sessions when DM noise sensing took place.

The stationary check can be based on raw time or frequency domain characteristics of the noise sources, such as a per tone PSD, aggregate per band power, number of impulse hits, duration of impulses, . . . or it can be based on derived noise signatures, such as type of impulses (REIN, SHINE, SHORT, . . . ), their frequency, the number of impulse sources present reported at the end of each Noise Finder session.

As an example, the post processing of stationary check between CM sessions with REIN impulses noise present can be done in terms of REIN frequency and duration of pulse duration by comparing the detected noise signatures. An allowable tolerance, such as a maximum 10% variation in both REIN frequency and duration between two CM noise finder sessions can be used to determine with some assurance that the same REIN noise is present during and in between the two CM noise finder sessions.

In an alternate example, the presence of a different number of REIN noise sources in the two CM sessions may lead to the determination that the noise has not been stationary across the imbalance measurement session. In such a scenario, comparison of the consistency of the min and max impulse PSDs across the CM noise finder sessions may help determine whether it would be preferable to use the min or the max PSD measured across the two CM and DM noise finder sessions in order to derive loop imbalance estimate. As an example, if max impulse PSD levels appear to be different across the two CM noise finder sessions, it would tend to suggest that the high noise level is associated with an intermittent high level impulse noise that is not present across the two sessions; in such a case, the min impulse PSD value across the DM and CM noise finder sessions is preferred for a more accurate estimate of the loop imbalance. On the other hand, if the min impulse PSD levels appear to be different across the two CM noise finder sessions, it would tend to suggest that the low noise level is associated with a low level intermittent impulse noise that is not present across the two sessions; in such a case, the max impulse PSD value across the DM and CM noise finder sessions is preferred for a more accurate estimate of the loop imbalance.

2) Consistency Check Between CM and DM:

Next, in step S910, it is determined whether the CM signal and its projection into DM have similar characteristics to ensure that what is sensed in DM originates from CM. For example, if a REIN signal with well-defined characteristics exists in CM (such as frequency and duration), it is expected to be detected with same characteristics in DM.

In embodiments, the consistency check between DM and CM noise finder sessions to determine that the same noise is present during the DM and CM sessions may be relaxed with respect to the stationary check between CM sessions because DM detection capability may be reduced with respect to CM detection capability, because of relatively lower signal levels in DM. For example a maximum 20% of variation in both REIN frequency and duration between DM and CM noise finder sessions may be acceptable. Or even, as soon as an impulsive noise source is detected in DM while one or multiple impulsive noise sources are detected in CM, it can be inferred practically that the most dominant noise source measured in CM is the one that is projected and detected in DM. Hence, the consistency check may just be limited to whether a single impulse source is detected in DM whenever one or more impulse noise sources are detected in the CM noise finder session.

In an alternate example, imbalance will be based on a single impulse noise type based on a priority level with, for example, a high priority given to REIN over SHORT over SHINE over SEIN noise, and in the case of multiple REIN noises, only one REIN noise is used to derive imbalance i.e, one with maximum duration in CM and the one with maximum duration in DM which may or may not correspond to same source. From this check, a decision can be made as to which signals and which characteristic of these signals to use for the estimate of the loop imbalance, or whether no loop imbalance can be derived. Also, if derived, a reliability factor can also be produced based on this check that reports the reliability of the noise signals selected for the imbalance estimation process.

3) Detection Level Check in DM or CM:

Next in step S912, it is determined if the projection of the assumed CM noise in DM is equal to or higher than the background noise level measured in DM in the absence of such CM noise. This is needed in order to infer that the CM noise impact in DM is meaningful, and that it can be used reliably for the loop imbalance estimate. Such detection level check may not be necessary on the CM sensor, since it is expected that all signals present in CM (background noise and interfering noise alike) constitute the overall signal level that may impact the DM sensor, regardless of whether they are part of the background noise or not.

In embodiments of step S912 a verification that the impulse PSD is above 3 dB of the background noise is performed. If not, the estimate is not computed or it is flagged as not reliable. The detected impulse PSD in CM can also have the 3 dB check on impulse signal level with respect to its background noise level along with DM before estimating the imbalance.

For continuous or intermittent wideband noise, if no background noise reference level is known apriori, a minimum signal level above a certain threshold needs to be achieved in order to flag the loop imbalance estimate to be reliable. This threshold may be set for example such that the CM noise needs to exceed −90 dBm/Hz and the expected corresponding DM projection to exceed −120 dBm/Hz. If such threshold is not met, the loop imbalance estimate will be reported as biased or unreliable.

Finally in step S914, a fairly accurate estimate of the loop imbalance can be derived from the ratio of line referred PSD levels obtained on both CM and DM sensors for the identified noise source. As an alternative to PSD level, an amplitude level or a function thereof of each signal in CM and DM can be used in the estimation of the loss of the CM signal in its conversion to DM. Also in step S914, an overall reliability metric can be produced together with the estimate that report on the overall reliability of the imbalance estimation process.

Figure 10:
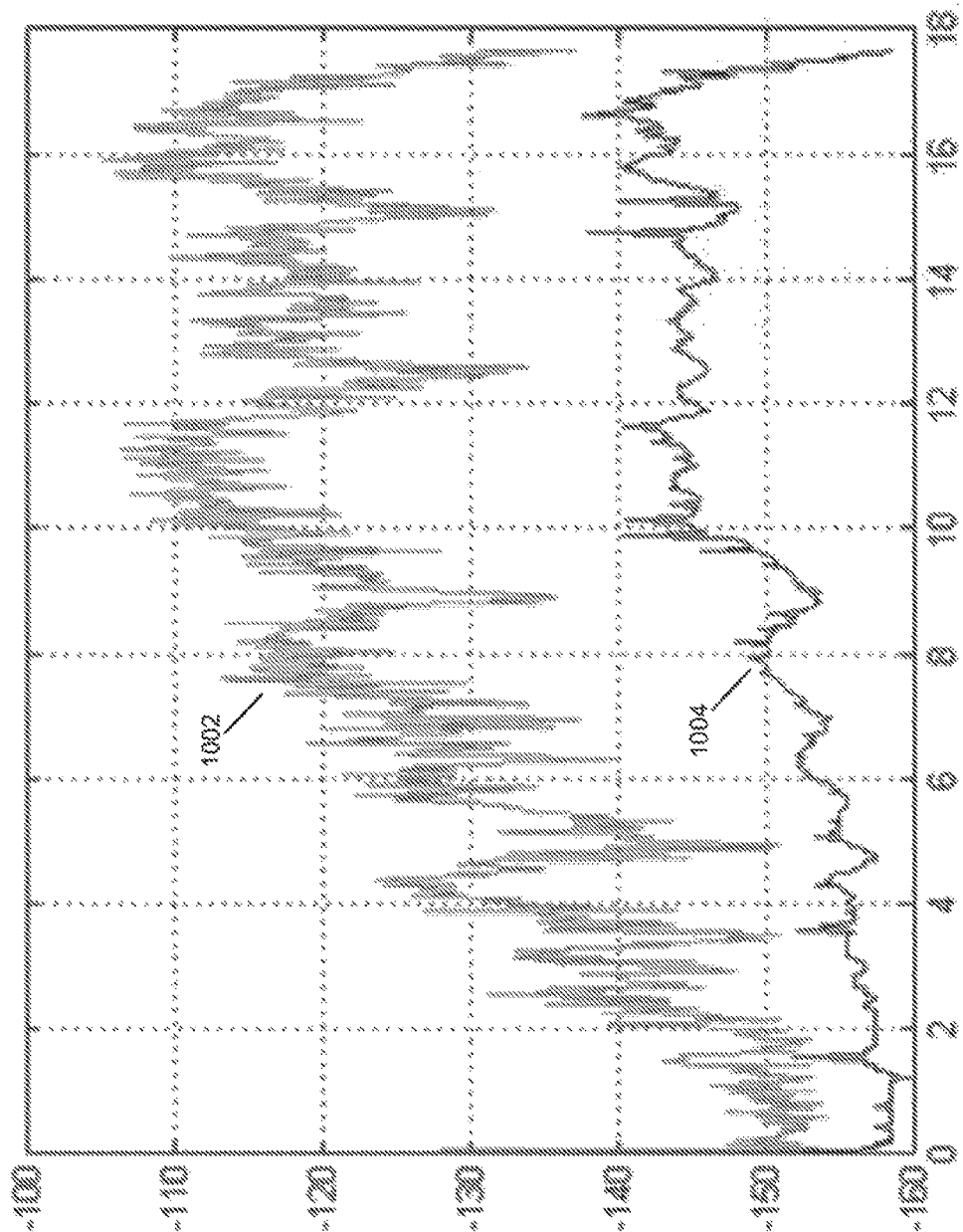
FIG. 10 is a chart illustrating an example of a line referred DM signal PSD of a SO Hz REIN for use in the method of FIG. 9 (x axis is MHz, y axis is dBm/Hz)
Figure 11:
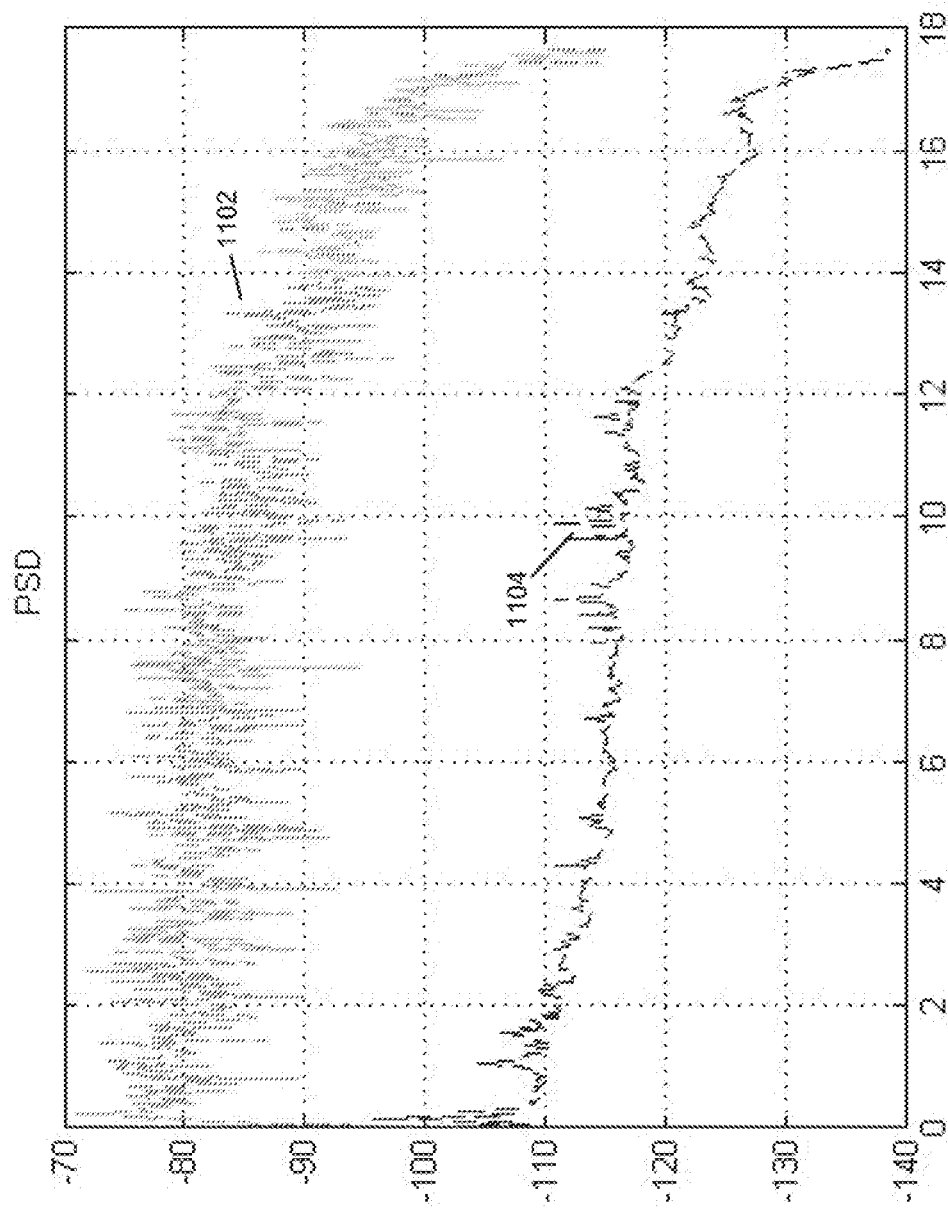
FIG. 11 is a chart illustrating an example of a line referred CM signal PSD of a 50 Hz REIN for use in the method of FIG. 9 (x axis is MHz, y axis is dBm/Hz)
Figure 12:
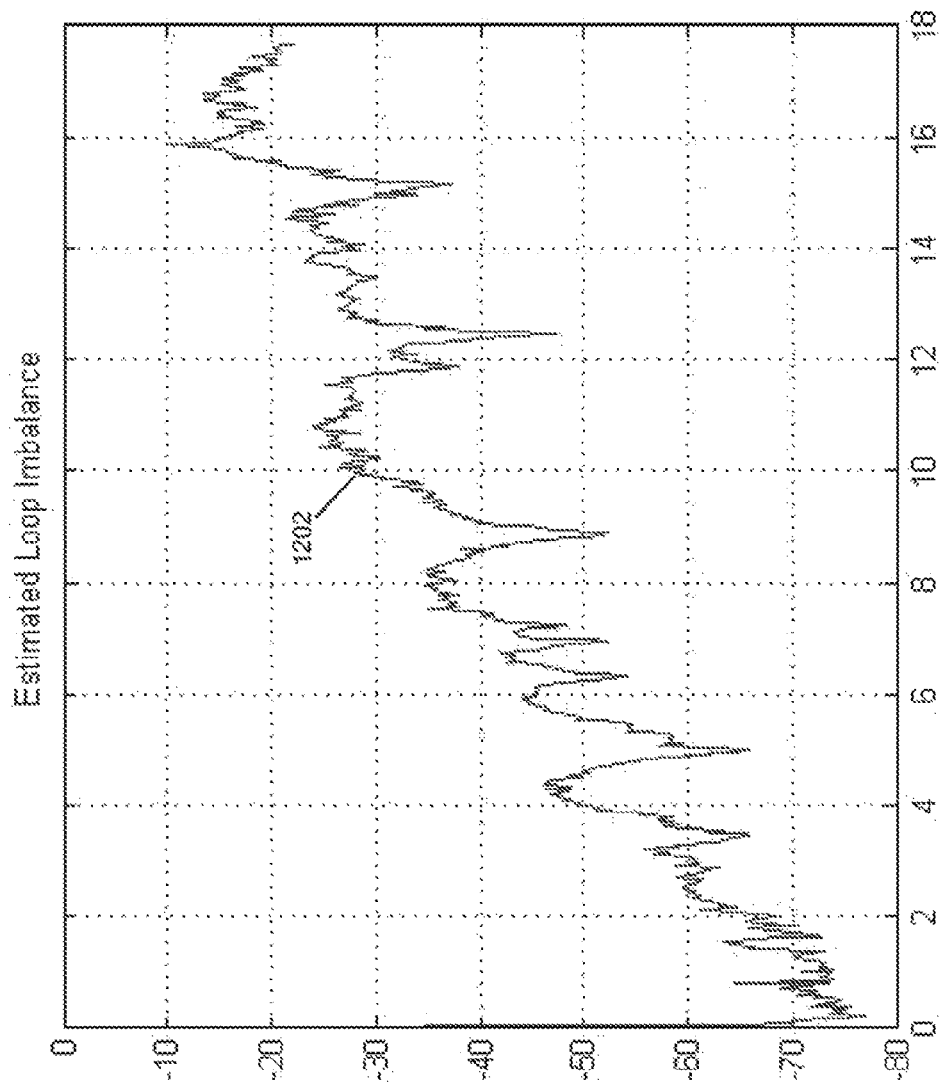
FIG. 12 is a chart illustrating an example indirect estimated loop imbalance using the signals shown in FIGS. 10 and 11 according to aspects of the invention.

This step is illustrated in more detail in the examples of FIGS. 10 to 12. More particularly, FIG. 10 illustrates an example of a line referred DM signal PSD of a 50 Hz REIN (impulse PSD 1002 and Background PSD 1004) obtained in a DM noise finder session according to embodiments of the invention. FIG. 11 illustrates an example of a line referred CM signal PSD of the same 50 Hz REIN (impulse PSD 1102 and Background PSD 1104) obtained in a CM noise finder session according to embodiments of the invention. FIG. 12 illustrates an example indirect estimated loop imbalance 1202 in dB obtained using the ratio of the line referred signals for the same 50 Hz REIN shown in FIG. 10 and FIG. 11.

As detailed earlier, the ratio of the CM PSD to the DM PSD reflects the loss of the ingress CM signal in its conversion to DM. In this example, a lower value (−70 dB) at low frequencies reflects the high balance of the loop at low frequency, while a higher value (−20 dB) at high frequencies reflects the low balance of the loop at high frequency. An average number of the per tone balance in whole or part of the bands of interest allows an appreciation of the absolute value of the loop imbalance where the DSL modem receives DSL signals (e.g. DS 1, DS2, DS3 band for a VDSL2 CPE modem).

The procedure of performing either or all of a stationarity check, consistency check or level check or a combination thereof, allows to derive an imbalance estimate together with a reliability metric indicating the quality of the signal characteristics used in this estimate.

In some scenarios, this reliability metric is so low that an estimate is provided with low confidence or not provided at all for all or part of the band for which the analysis is done. According to certain aspects that should be apparent from the foregoing, with a platform that enables consecutive measurements of DM and CM signals on a twisted pair loop, embodiments of the invention are able to characterize noise at their source as well as to assess the loop imbalance, whenever the noise source causes instability on the line.

While the direct loop balance measurement can be invoked at any time even in the absence of a CM disturber on the line, the indirect loop balance measurement can be particularly useful in scenarios where CM noise is suspected or expected to be the source of the DM noise sensed, such is the case whenever a modem retrains due to excessive increase of DM noise sensed.

A practical use case of an indirect loop imbalance measurement would therefore consist in performing a CM and DM noise finder session directly following a retrain event on the line, expecting that the noise source that caused the retrain is still present during the loop imbalance measurement session.

The steps in the process can therefore be:

1) Detection of a DM Noise (impulsive, intermittent WB) with the Noise monitor module while the modem is in showtime. Determination of its characteristics before the modem retrains.

2) Run DM and CM, or CM only NF sessions, immediately after the DSL link is dropped in order to determine the stationary and consistency conditions of the noise, allowing the derivation of an indirect loop imbalance measurement while the noise is believed to be continuously present after the link is dropped.

Note that the detection of the arrival of the noise by the Noise Monitor module while the modem is in showtime already allows the determination of a background PSD and of the projected CM noise in DM, thereby eliminating the need for a DM NF session in the loop imbalance measurement, which can therefore consist of a single CM NF session with the assumption that the noise is still present. Alternatively, the determination of the background PSD and of the projected CM noise in DM while the modem is in showtime can help determine that the minimum power increase has been achieved in DM at any given frequency such that the DM Noise PSD can be considered reliably in the loop imbalance estimate.

A CM noise finder session following the link drop caused by an increase of noise in DM also allows the better characterization of the noise source that is likely causing the retrain.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   sensing a common mode (CM) signal corresponding to a noise source affecting a twisted pair;
   sensing a differential mode (DM) signal also corresponding to the noise source;
   determining a relationship between the sensed CM signal and sensed DM signal; and
   determining a loop imbalance of the twisted pair based at least in part on the determined relationship.

2. The method according to claim 1, wherein sensing the CM signal and sensing the DM signal comprises:
   receiving the CM signal and the DM signal from an external sensor that is independent of a receiver of the CM signal and the DM signal.

3. The method according to claim 1, wherein sensing the CM signal and sensing the DM signal comprises:
   controlling an internal sensor that is integrated to a front end of a receiver and controlled by the receiver.

4. The method according to claim 1, further comprising: reporting the loop imbalance on one of a per tone basis and a per sub-band basis.

5. The method according to claim 1, wherein determining a relationship between the sensed CM signal and sensed DM signal comprises:
   characterizing CM noise based at least in part on the sensed CM signal and the sensed DM signal.

6. The method of claim 5, wherein characterizing the CM noise comprises:
   performing a first characterization session on the sensed DM signal and performing a second characterization session on the sensed CM signal consecutive to the first characterization session.

7. The method of claim 5, wherein performing the first characterization session on the sensed DM signal and performing the second characterization session on the sensed CM signal occur simultaneously.

8. An apparatus including a xDSL modem coupled to a twisted pair, comprising:
   a first sensor to sense a common mode (CM) signal corresponding to a noise source affecting the twisted pair;
   a second sensor to sense a differential mode (DM) signal also corresponding to the noise source;
   a signal processing block to determine a relationship between the sensed CM signal and the sensed DM signal; and
   wherein the signal processing block includes a loop imbalance processing block to determine a loop imbalance of the twisted pair based at least in part on the determined relationship.

9. The apparatus of claim 8, wherein at least one of the first sensor or the second sensor is an external sensor not controlled by a receiver of the CM signal and the DM signal.

10. The apparatus of claim 8, wherein at least one of the first sensor or the second sensor is an internal sensor integrated to a front end of a receiver, wherein the internal sensor is controlled by the receiver.

11. The apparatus of claim 8, wherein the loop imbalance processing block is further configured to report the loop imbalance on one of a per tone basis and a per sub-band basis.

12. The apparatus of claim 8, wherein the signal processing block is further configured to characterize CM noise based at least in part on the sensed CM signal and the sensed DM signal.

13. The apparatus of claim 12, wherein characterizing the CM noise based at least in part on the sensed CM signal and the sensed DM signal comprises performing a first characterization session on the sensed DM signal and performing a second characterization session on the sensed CM signal.

14. The apparatus of claim 13, wherein the first characterization session and the second characterization session occur simultaneously.

15. A non-transitory computer-readable medium storing code for xDSL communication, the code comprising instructions executable to:
   sense a common mode (CM) signal corresponding to a noise source affecting a twisted pair;
   sense a differential mode (DM) signal also corresponding to the noise source;
   determine a relationship between the sensed CM signal and sensed DM signal; and
   determine a loop imbalance of the twisted pair based at least in part on the determined relationship.

16. The non-transitory computer-readable medium of claim 15, wherein the instructions executable to sense the CM signal and sense the DM signal comprise:

instructions executable to receive the CM signal and the DM signal from an external sensor not controlled by a receiver of the CM signal and the DM signal.

17. The non-transitory computer-readable medium of claim 15, wherein the instructions executable to sense the CM signal and sense the DM signal comprise:

instructions executable to control an internal sensor that is integrated to a front end of a receiver and controlled by the receiver.

18. The non-transitory computer-readable medium of claim 15, wherein the instructions are executable to:

report the loop imbalance on one of a per tone basis and a per sub-band basis.

19. The non-transitory computer-readable medium of claim 15, wherein the instructions executable to determine the relationship between the sensed CM signal and the sensed DM signal comprise:

instructions executable to characterize CM noise based at least in part on the sensed CM signal and the sensed DM signal.

20. The non-transitory computer-readable medium of claim 19, wherein the instructions executable to characterize the CM noise comprise:

instructions executable to perform a first characterization session on the sensed DM signal and perform a second characterization session on the sensed CM signal.

* * * * *